United States Patent
Touil et al.

(10) Patent No.: US 10,902,479 B2
(45) Date of Patent: Jan. 26, 2021

(54) PROGRAMMATIC GENERATION AND OPTIMIZATION OF IMAGES FOR A COMPUTERIZED GRAPHICAL ADVERTISEMENT DISPLAY

(71) Applicant: Criteo SA, Paris (FR)

(72) Inventors: Sami Touil, Paris (FR); Hugo Kaczmarek, Paris (FR); Thomas Delayen, Chaville (FR)

(73) Assignee: Criteo SA, Paris (FR)

( * ) Notice: Subject to any disclaimer, the term of this patent is extended or adjusted under 35 U.S.C. 154(b) by 126 days.

(21) Appl. No.: 15/786,462

(22) Filed: Oct. 17, 2017

(65) Prior Publication Data
US 2019/0114678 A1    Apr. 18, 2019

(51) Int. Cl.
G06Q 30/00    (2012.01)
G06Q 30/02    (2012.01)
G06T 11/60    (2006.01)

(52) U.S. Cl.
CPC ..... *G06Q 30/0276* (2013.01); *G06Q 30/0244* (2013.01); *G06Q 30/0246* (2013.01);
(Continued)

(58) Field of Classification Search
CPC ....... G06Q 30/0207–30/0277; G06Q 30/0276; G06Q 30/0244; G06Q 30/0246; G06Q 30/0254; G06T 11/60
(Continued)

(56) References Cited

U.S. PATENT DOCUMENTS 8,473,349 B1 * 6/2013 Manber ........... G06Q 30/02
                                                705/14.48
9,691,086 B1 * 6/2017 Deodhar ........... G06F 17/21
(Continued)

FOREIGN PATENT DOCUMENTS

JP    2014132392 A  *  7/2014  .......... G06K 9/34
JP    2017012446 A  *  1/2017  .......... A61B 6/03
JP    2017184092 A  * 10/2017  .......... H04N 19/176

OTHER PUBLICATIONS

Collomosse, John Philip. Higher Level Techniques for the Artistic Rendering of Images and Video. (2004). Retrieved online Sep. 14, 2020. https://core.ac.uk/download/pdf/8767749.pdf (Year: 2004).*
(Continued)

*Primary Examiner* — James A Reagan
(74) *Attorney, Agent, or Firm* — Proskauer Rose LLP (57) ABSTRACT

A computer receives a request for graphical display source code for a computerized graphical advertisement display, and retrieves seed images including a plurality of seed image features. The computer generates candidate images based on the one or more seed images, where the computer alters a first aspect of a seed image to generate an altered seed image having a plurality of altered seed image features and the computer alters a second aspect of the altered seed image to generate a candidate image having a plurality of candidate image features. The computer generates candidate image scores based upon a context of the advertisement display and the plurality of candidate image features. The computer selects an image from the candidate images based on the candidate image scores and generates the graphical display source code based on the selected image, a size of the advertisement display, and display capabilities of the user device.

25 Claims, 3 Drawing Sheets

(52) U.S. Cl.
CPC ..... *G06Q 30/0254* (2013.01); *G06Q 30/0277* (2013.01); *G06T 11/60* (2013.01)

(58) Field of Classification Search
USPC ............ 705/14.1–14.73, 14.72, 14.4; 725/32
See application file for complete search history.

(56) References Cited

U.S. PATENT DOCUMENTS

| | | |
|---|---|---|
| 2004/0194028 A1 | 9/2004 | O'Brien |
| 2005/0055635 A1 | 3/2005 | Bargeron et al. |
| 2006/0277102 A1* | 12/2006 | Agliozzo ............... G06Q 30/02 705/14.41 |
| 2007/0079236 A1 | 4/2007 | Schrier et al. |
| 2007/0253028 A1 | 11/2007 | Widdowson |
| 2008/0059312 A1* | 3/2008 | Gern ..................... G06Q 30/02 705/14.72 |
| 2009/0055755 A1* | 2/2009 | Hicks ................... G06F 16/958 715/760 |
| 2010/0169311 A1 | 7/2010 | Tengli et al. |
| 2013/0014008 A1 | 1/2013 | Damera-venkata |
| 2013/0138643 A1 | 5/2013 | Ramanathan et al. |
| 2014/0100943 A1* | 4/2014 | Palihapitiya ....... G06Q 30/0251 705/14.39 |
| 2015/0007064 A1* | 1/2015 | Givoni ................. G06F 16/958 715/760 |
| 2015/0019958 A1 | 1/2015 | Ying et al. |
| 2015/0088703 A1 | 3/2015 | Yan |
| 2015/0127565 A1* | 5/2015 | Chevalier ............. G06Q 10/00 705/319 |
| 2015/0254732 A1 | 9/2015 | Snyder |
| 2016/0085514 A1* | 3/2016 | Savliwala ............... G06F 16/22 705/14.69 |
| 2016/0110063 A1 | 4/2016 | Connolly et al. |
| 2016/0150879 A1 | 6/2016 | Linder et al. |
| 2016/0275554 A1 | 9/2016 | Yan et al. |
| 2016/0275572 A1* | 9/2016 | Omachi ............... G06Q 30/0277 |
| 2017/0024362 A1 | 1/2017 | Borders |
| 2017/0032554 A1 | 2/2017 | O'Donovan et al. |
| 2017/0278289 A1* | 9/2017 | Marino ............... G06K 9/00765 |
| 2018/0096399 A1 | 4/2018 | Delayen et al. |
| 2018/0348883 A1* | 12/2018 | Kramer ................. G06F 3/0236 |
| 2019/0114679 A1* | 4/2019 | Gangloff ................ G06T 13/80 |

OTHER PUBLICATIONS

Wheeler et al. Skylign: a tool for creating informative, interactive logos representing sequence alignments and profile hidden Markov models. (Jan. 13, 2014). Retrieved online Sep. 14, 2020. https://bmcbioinformatics.biomedcentral.com/articles/10.1186/1471-2105-15-7 (Year: 2014).*

NIH Biomedical Research Center for Macromolecular Modeling and Bioinformatics Theoretical and Computational Biophysics Group. VMD User's Guide. (Nov. 27, 2016). Retrieved online Sep. 14, 2020. https://www.ks.uiuc.edu/Research/vmd/current/ug.pdf (Year: 2016).*

* cited by examiner

PROGRAMMATIC GENERATION AND OPTIMIZATION OF IMAGES FOR A COMPUTERIZED GRAPHICAL ADVERTISEMENT DISPLAY

TECHNICAL FIELD

The present technology relates to the generation of graphical display source code for a computerized graphical advertisement display, and, more particularly, to the generation and optimization of images displayed within a computerized graphical advertisement display.

BACKGROUND

Publisher systems can provide webpages or other online content that can include one or more advertisement display opportunities for computerized graphical advertisement displays (e.g., space for a banner advertisement across the top of the webpage, within an application, or within other media such as videos or images). In some instances, when a user device (e.g., a computer running a web browser) processes a webpage for display, the user device can request, from an ad system, graphical display source code for a computerized graphical advertisement display for one of the advertisement display opportunities. The ad system can provide the graphical display source code to the user device to render and/or display. The graphical display source code can include a link or other reference to an image or images that are displayed within the advertisement. In some systems, the images used for computerized graphical advertisement displays are static. This can result in ad systems using images for computerized graphical advertisement displays that are not tailored for display on a particular user device, within a particular application, for a particular user—and further tailored according to the publisher context.

SUMMARY

Accordingly, there is a need for technology to dynamically generate images to be included in computerized graphical advertisement displays based upon computer-generated characteristics. The technology described herein beneficially provides computerized graphical advertisement displays with images that are tailored for display on a particular user device, within a particular application, for a particular user—and further tailored according to the publisher context.

In one aspect, there is a computer-implemented method of generating graphical display source code for a computerized graphical advertisement display. A computing device receives, from a user device, a request for the graphical display source code for the computerized graphical advertisement display. The computing device retrieves one or more seed images, each seed image of the one or more seed images including a plurality of associated seed image features. The computing device generates a plurality of candidate images based on at least the one or more seed images, where the computing device alters a first aspect of a seed image to generate an altered seed image having a plurality of associated altered seed image features and the computing device alters a second aspect of the altered seed image to generate a candidate image having a plurality of associated candidate image features. The computing device determines a context associated with the computerized graphical advertisement display. The computing device generates a plurality of candidate image scores, each candidate image score of the plurality of candidate image scores associated with a candidate image of the plurality of candidate images and each candidate image score based upon the context and the plurality of associated candidate image features. The computing device selects an image from the plurality of candidate images based on the plurality of candidate image scores. The computing device generates the graphical display source code based on the selected image, a size of the computerized graphical advertisement display, and one or more display capabilities of the user device. The computing device provides the graphical display source code to the user device.

In another aspect, there is a computerized system for generating graphical display source code for a computerized graphical advertisement display. The system comprises a computing device that receives, from a user device, a request for the graphical display source code for the computerized graphical advertisement display. The computing device retrieves one or more seed images, each seed image of the one or more seed images including a plurality of associated seed image features. The computing device generates a plurality of candidate images based on at least the one or more seed images, where the computing device alters a first aspect of a seed image to generate an altered seed image having a plurality of associated altered seed image features and the computing device alters a second aspect of the altered seed image to generate a candidate image having a plurality of associated candidate image features. The computing device determines a context associated with the computerized graphical advertisement display. The computing device generates a plurality of candidate image scores, each candidate image score of the plurality of candidate image scores associated with a candidate image of the plurality of candidate images and each candidate image score based upon the context and the plurality of associated candidate image features. The computing device selects an image from the plurality of candidate images based on the plurality of candidate image scores. The computing device generates the graphical display source code based on the selected image, a size of the computerized graphical advertisement display, and one or more display capabilities of the user device. The computing device provides the graphical display source code to the user device.

Any of the above aspects can include one or more of the following features. In some embodiments, the user device renders the graphical display source code to display the computerized graphical advertisement display. In some embodiments, the graphical display source code comprises one or more of HTML, JAVASCRIPT, CSS, or XML. In some embodiments, the graphical display source code includes a reference to the selected image. In some embodiments, the graphical display source code includes a reference to a video containing the selected image.

In some embodiments, the associated seed image features include one or more of: image size, image compression, image encoding type, frame count, file weight, image metadata, image colors, image context, image resolution, image category, one or more shapes in the image, or one or more objects in the image. In some embodiments, the associated altered seed image features include one or more of: image size, image compression, image encoding type, frame count, file weight, image metadata, image colors, image context, image resolution, image category, one or more shapes in the image, or one or more objects in the image. In some embodiments, the associated candidate image features include one or more of: image size, image compression, image encoding type, frame count, file weight, image metadata, image colors, image context, image resolution, image category, one or more shapes in the image, or one or more objects in the image.

In some embodiments, altering a first aspect of a seed image to generate an altered seed image comprises at least one of: cropping at least a portion of the seed image, applying an image filter to at least a portion of the seed image, layering text onto at least a portion of the seed image, or merging another image with the seed image to generate a new image. In some embodiments, altering a second aspect of the altered seed image to generate a candidate image comprises at least one of: cropping at least a portion of the altered seed image, applying an image filter to at least a portion of the altered seed image, layering text onto at least a portion of the altered seed image, or merging another image with the altered seed image to generate a new image.

In some embodiments, the context comprises one or more of: a layout description for the computerized graphical advertisement display, a placement of the computerized graphical advertisement display on a website, an application associated with the computerized graphical advertisement display, or one or more features of a user associated with the request. In some embodiments, the computing device extracts at least a portion of the associated altered seed image features from the altered seed image, and generates an altered seed image score for the altered seed image based upon the extracted image features. In some embodiments, the computing device removes an altered seed image from the plurality of altered seed images based upon a comparison of the extracted image features for the altered seed image with extracted image features for one or more other altered seed images.

In some embodiments, generating the plurality of candidate images based on at least the one or more seed images comprises excluding one or more candidate images based on a pre-determined constraint on a feature of the candidate image. In some embodiments, generating the plurality of candidate images based on at least the one or more seed images comprises excluding one or more candidate images by random sampling. In some embodiments, generating the plurality of candidate images based on at least the one or more seed images comprises excluding one or more candidate images based upon predicted scores associated with the one or more candidate images. In some embodiments, generating the plurality of candidate image scores comprises generating the score for a candidate image based on one or more of a predicted probability of interaction by a user with a computerized graphical advertisement display that includes the candidate image, an expected sales amount associated with the candidate image, an expected advertiser margin associated with the candidate image, and an expected value associated with the candidate image. In some embodiments, the interaction by a user with the computerized graphical advertisement display based on the candidate image is a click on the computerized graphical advertisement display based on the candidate image.

In some embodiments, generating the plurality of candidate image scores comprises generating the score for a candidate image based on one or more of a display context for the computerized graphical display, historical performance data for the candidate image, behavioral data for a user associated with the user device, one or more recommended products for display in the computerized graphical display, a temporal context for the computerized graphical display, and a geographical context for the computerized graphical display. In some embodiments, selecting an image from the plurality of candidate images based on the plurality of candidate image scores comprises selecting a candidate image from the plurality of candidate images having a highest candidate image score of the plurality of candidate image scores. In some embodiments, selecting an image from the plurality of candidate images based on the plurality of candidate image scores comprises selecting a candidate image from the plurality of candidate images having a candidate image score lower than a highest candidate image score of the plurality of candidate image scores. In some embodiments, selecting an image from the plurality of candidate images based on the plurality of candidate image scores comprises selecting a candidate image from the plurality of candidate images based on sampling a subset of the plurality of candidate images, where the subset is determined based on the plurality of candidate image scores.

In some embodiments, the computing device alters one or more image features of the selected image, where the one or more image features are independent of the size of the computerized graphical advertisement display and position-independent, based on one or more of a display context for the computerized graphical display, historical performance data for the selected image, behavioral data for a user associated with the user device, one or more recommended products for display in the computerized graphical display, a temporal context for the computerized graphical display, and a geographical context for the computerized graphical display. In some embodiments, one or more candidate images of the plurality of candidate images are generated by the computing device altering one or more of the associated candidate image features of a second candidate image of the plurality of candidate images. In some embodiments, retrieving the one or more seed images comprises selecting the one or more seed images based on the one or more display capabilities of the user device.

In some embodiments, the computing device selects a second image from the plurality of candidate images based on the context and the plurality of candidate image scores, generates second graphical display source code based on the second image, the size of the computerized graphical advertisement display, and the one or more display capabilities of the user device, and provides the second graphical display source code to the user device.

Other aspects and advantages of the present technology will become apparent from the following detailed description, taken in conjunction with the accompanying drawings, illustrating the principles of the technology by way of example only.

BRIEF DESCRIPTION OF THE DRAWINGS

The foregoing and other objects, features, and advantages of the present technology, as well as the technology itself, will be more fully understood from the following description of various embodiments, when read together with the accompanying drawings, in which.

DETAILED DESCRIPTION

The present technology provides systems and methods for the computerized generation of graphical display source code for computerized graphical advertisement displays. In some embodiments, the technology can provide improved computerized graphical advertisement displays by generating displays with customized, context-specific images that are optimized for the particular computing device on which the computerized graphical advertisement display will be rendered, as well as for a user of the computing device and for the particular publisher context. Beneficially, the technology can programmatically generate varied candidate images for the computerized graphical advertisement display using a series of progressive mutations of a seed image, and select a candidate image from the candidate images for use in generating the graphical display source code for the computerized graphical advertisement display.

Although the technology is illustrated and described herein with reference to specific embodiments, the technology is not intended to be limited to the details shown. Various modifications can be made in the details within the scope of the claims and without departing from the technology.

Figure 1:
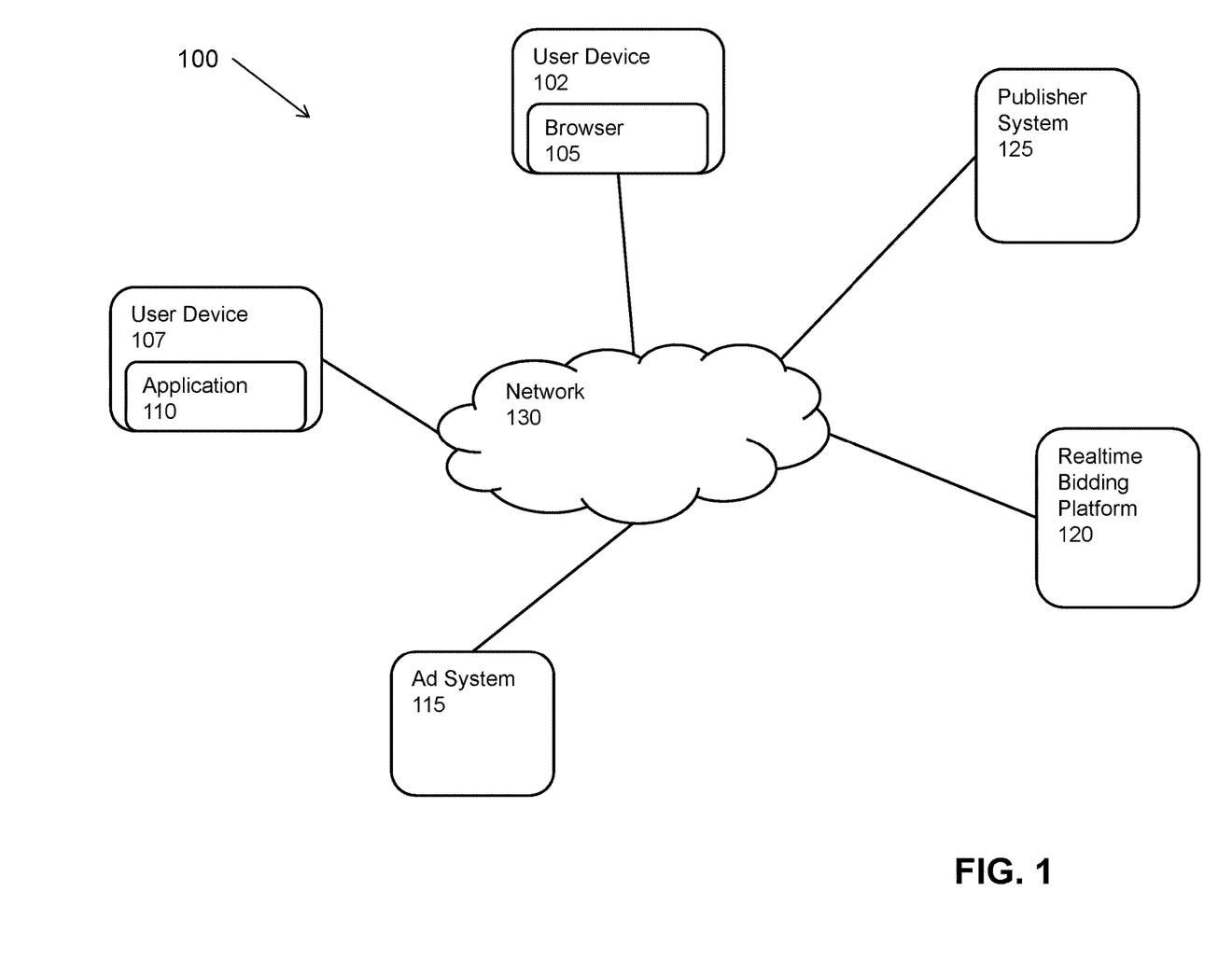
FIG. 1 is a diagram of a networked system in accordance with embodiments of the technology.

FIG. 1 is a diagram of networked system 100 in accordance with embodiments of the technology. As illustrated, networked system 100 can include user device 102, user device 107, ad system 115, realtime bidding ("RTB") platform 120, and publisher system 125. User device 102, user device 107, ad system 115, RTB platform 120, and publisher system 125 can be in data communication via network 130. User devices 102 and 107 can each be any computing devices. In some embodiments, user devices 102 and 107 can each be one of a mobile computing device (e.g., cellular phones and/or tablets), a PC, or other computing device. User device 102 executes web browser 105. User device 107 executes application 110 (e.g., a mobile application that interacts with online content).

Ad system 115 can be any computing device, such as a server or multiple servers. In some embodiments, ad system 115 can collect behavioral data for a plurality of devices, browsers, and/or applications. In some embodiments, ad system 115 can receive behavioral data for a plurality of devices, browsers, and/or applications from third-parties. In some embodiments, ad system 115 can provide graphical display source code for a computerized graphical advertisement display in accordance with the present technology.

RTB platform 120 can be any computing device, such as a server or multiple servers. In some embodiments, RTB platform 120 can perform auctions for advertising display opportunities in online media, such as webpages or application content served by publisher system 125, that are provided to user devices 102 and/or 107. Ad system 115 can submit bids for such advertising opportunities, and if ad system 115 wins the auction, ad system 115 can provide source code or other display data for a computerized graphical advertisement display to fill the advertising display opportunity. Publisher system 125 can be any computing device, such as a server or multiple servers. In some embodiments, publisher system 125 can serve webpages to browser 105. In some embodiments, publisher system 125 can serve other content to application 110. In some embodiments, publisher system 125 can communicate with ad system 115 to determine whether ad system 115 will provide source code for a computerized graphical advertisement display to fill an advertisement display opportunity in a webpage or application content. Network 130 can be any network or multiple networks. For example, network 140 can include cellular networks through which user devices 102 and 107 are connected and the Internet.

The present technology provides systems and methods for the computerized generation of graphical display source code using customized, context-specific images created by programmatically mutating seed images. Generally speaking, the system described herein can receive a seed image (e.g., JPEG, GIF) that depicts an item to be displayed in a graphical advertisement display, such as a product. The seed images can be source images (e.g., from an advertiser's catalog), mutated images that the system has previously generated either offline or in real time. Each seed image can have certain features and attributes, including but not limited to: image size, image compression, image encoding type, frame count, file weight, image metadata, image colors, image context, image resolution (e.g., DPI), image category, one or more shapes in the image, or one or more objects in the image. The system can apply a series of mutations to a seed image in order to generate a plurality of different images (also called candidate images) that can have different features and attributes from the seed image. A mutation is an operation that can be applied to an image to generate one or more new images. For example, the mutations can include operations such as cropping at least a portion of the seed image, applying an image filter to at least a portion of the seed image, layering text onto at least a portion of the seed image, or merging another image with the seed image to generate a new image. It should be appreciated that the system can apply further mutations to an already-mutated image to generate a new image that incorporates the additional mutations. As such, the system can apply a plurality of mutations to an image (e.g., in a sequence) to generate a wide array of different candidate images. In addition, because the combination of a plurality of mutations may not be commutative, the mutations can be applied in different sequences to a seed image to generate different images—for example, applying a brightness filter first then mixing the seed image with another image may not generate the same new image as mixing the seed image first, then applying the brightness filter.

The system can analyze the features of each of the candidate images to generate a corresponding candidate image score. In some embodiments, the score is based upon one or more of the candidate image features and a context of the computerized graphical advertisement display into which the candidate image will be placed. For example, the context can include characteristics such as a layout description for the computerized graphical advertisement display, a placement of the computerized graphical advertisement display on a website, an application associated with the computerized graphical advertisement display, or one or more features of a user associated with the request for the graphical advertisement display. In some embodiments, the system can use predictive and/or historical data relating to the context in order to generate the score for a candidate image. The predictive and/or historical data can include data elements such as a predicted probability of interaction by a user with a computerized graphical advertisement display that includes the candidate image, an expected sales amount associated with the candidate image, and an expected value associated with the candidate image. It should be appreciated that the context and the predictive and/or historical data can relate to additional characteristics such as the publisher of the advertisement display, the advertiser, and so forth—and the system can use these additional characteristics when generating the score.

The system can extract image features from the seed images, any intermediate mutated images, and/or the candidate images in order to generate a score for the respective images. In addition, the extracted features can be used by the system to filter images that may be similar—for example, if one or more features of two different candidate images are very similar, the system may determine that only one of the candidate images should be kept for possible insertion into a graphical advertisement display. In another example, the system can determine that a random subset of candidate images should be kept.

It should further be appreciated that the system may not render the candidate images and/or the intermediate altered images during the process described herein. Instead, in some embodiments, the system can render only the candidate image(s) that are selected for insertion into a graphical advertisement display. As a result, the system can utilize fewer computing resources when generating candidate images and provide a more efficient image generation process.

In some embodiments, the system can pre-score any of the above-described images (i.e., seed images, altered seed images) by generating a score for the image when it is generated by the system. For example, for images generated offline, the system can concurrently generate a score for the image at that point in time and use the score to determine which seed images and/or which altered seed images should be used for further image generation to arrive at candidate images.

Figure 2:
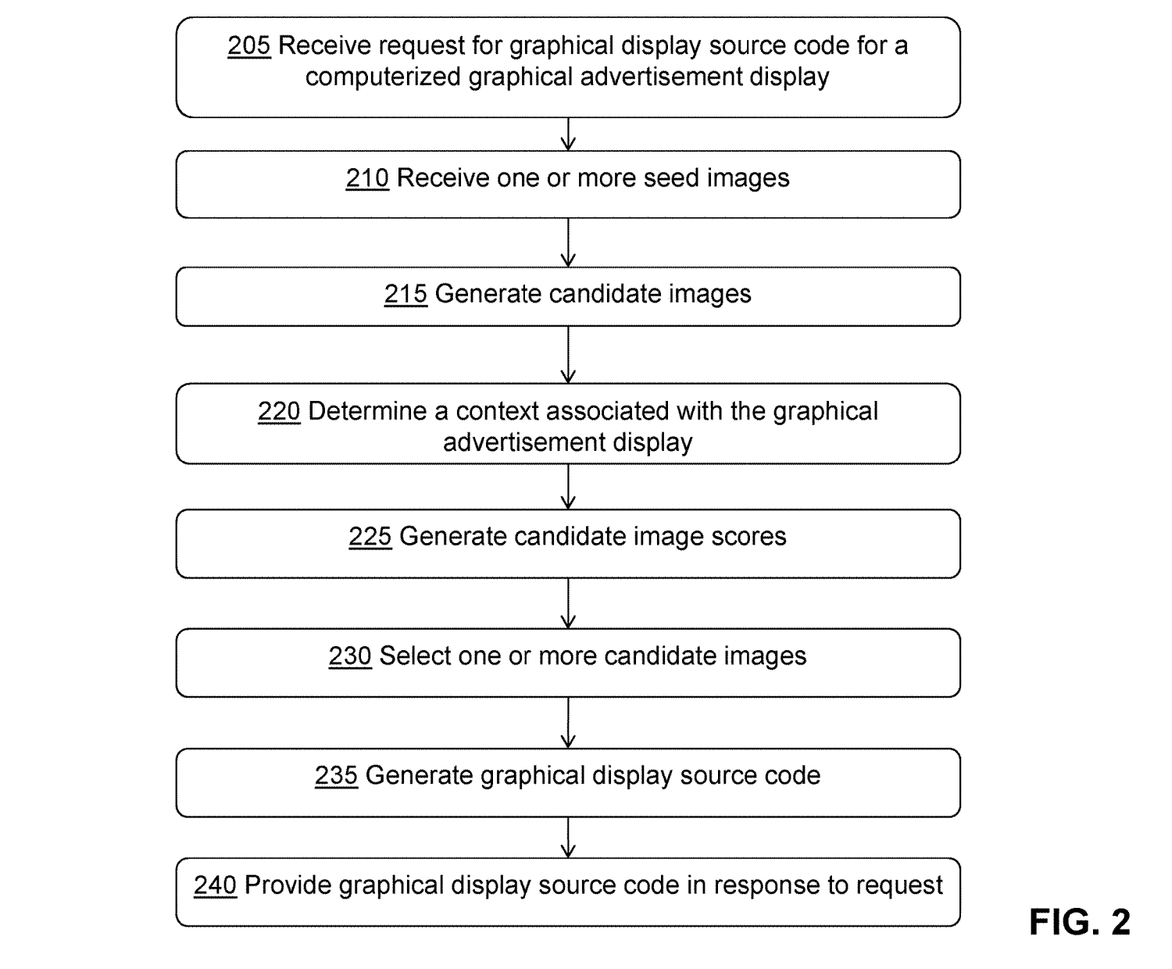
FIG. 2 depicts a flow chart for the generation of graphical display source code for a computerized graphical advertisement display.

FIG. 2 depicts a flow chart for the generation of graphical display source code for a computerized graphical advertisement display. At step 205, an ad system (e.g., ad system 115) receives a request for graphical display source code for a computerized graphical advertisement display. The request can be received from a browser or other application executing on a user device (e.g., browser 105 on user device 102). At step 210, the ad system retrieves one or more seed images. In some embodiments, the ad system can retrieve the seed images from system memory or other storage accessible by the ad system (e.g., the advertiser website), or a storage only accessible by the end user (e.g., cookie). In some embodiments, the ad system can retrieve the seed images based on display capabilities of the user device. For example, seed images can be retrieved that are potentially usable based on the resolution and screen size of the user device.

Each of the seed images can have associated seed image features. For example, as described above, the seed image features can include image size, image compression, image encoding type, frame count, file weight, image metadata, image colors, image context, image category, one or more shapes in the image, or one or more objects in the image. The seed image features can be, e.g., stored as metadata in a data storage device and retrieved by the ad system 115. In some embodiments, the ad system retrieves the seed image features at the same time as the seed image is retrieved.

Figure 3:
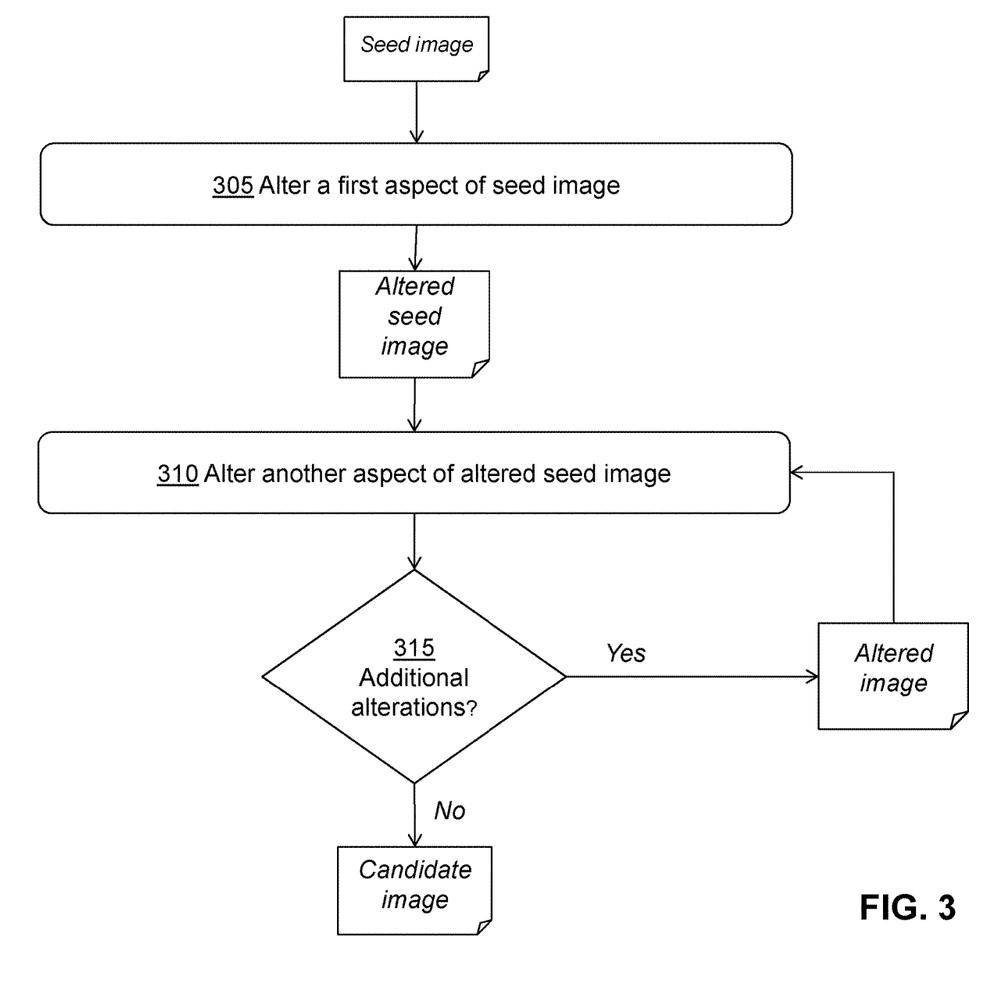
FIG. 3 depicts a flow chart for the generation of candidate images.

At step 215, the ad system generates candidate images. In some embodiments, the ad system can generate the candidate images by altering aspects of one or more of the seed images. FIG. 3 depicts a flow chart for the generation of candidate images. At step 305, the ad system receives one or more seed images and performs a first alteration operation on the seed image(s). An alteration operation can be any operation that can alter one or more aspects of the seed image(s). For example, the ad system can crop at least a portion of the seed image. In some embodiments, the ad system can perform a 'smart' crop operation, where the ad system focuses on parts of the image that are meaningful (e.g., the face of a person, a house in a landscape) and crops less meaningful portions of the image. In a similar way, the ad system can perform a 'smart' resize operation on the image. The ad system can apply an image filter (e.g., brightness, saturation, hue rotation, edge sharpening, etc.) to at least a portion of the seed image. The ad system can layer text onto at least a portion of the seed image, in order to display additional information such as the price or discount of an object depicted in the image, a title associated with the image, and so forth. The ad system can merge another image with the seed image to generate a new image, such as displaying different points of view of the same product, displaying a zoomed part of the main image, displaying a brand logo in conjunction with a product, displaying a star rating in conjunction with a product, and the like. The result of the alteration operation on the seed image is an altered seed image with associated altered seed image features. At least some of the altered seed image features may have different values than the same features of the seed image, due to the alteration operation.

At step 310, the ad system performs a second alteration operation, this time on the altered seed image resulting from step 305. It should be appreciated that the second alteration operation can be the same as the first alteration operation (i.e., crop a portion of the seed image, then crop a portion of the altered seed image) or the second alteration operation can be different than the first alteration operation (i.e., apply a brightness filter to the seed image, then layer text onto a portion of the altered seed image). At step 315, the ad system can determine whether to apply additional alteration operations to the intermediate image. If there are additional alteration operations to perform, the ad system returns to step 310. Once all alteration operations have been performed, the result of the alteration operation(s) is a candidate image.

It should be appreciated that the ad system can exclude one or more of the resulting altered seed images generated in step 305 and/or any of the candidate images generated in step 310. Excluding a generated image prevents the ad system from using the image in later steps of the illustrated method. In some embodiments, an image can be excluded based on a pre-determined constraint on a feature of the image. For example, the requesting user device (or an application running thereon) can have pre-defined constraints on the size, resolution, or navigation of computerized graphical advertisement displays. Based on these constraints, the ad system can exclude any intermediate images and/or candidate images having image features that would not display properly on the user device. In some embodiments, images can be excluded by random sampling. For example, the ad system can exclude an image based on a number generated by a random (or pseudorandom) number generator. In some embodiments, resulting images can be excluded based on predicted scores associated with candidate images, such as anticipated performance (e.g., whether the layout description is expected to result in an ad that will generate a click or sale).

With reference to FIG. 2, at step 220, the ad system determines a context associated with the computerized graphical advertisement display. As mentioned above, the context can be any attribute that relates to the computerized graphical advertisement display. Exemplary context information can include, but is not limited to characteristics such as a layout description for the computerized graphical advertisement display, a placement of the computerized graphical advertisement display on a website, an application associated with the computerized graphical advertisement display, or one or more features of a user associated with the request for the graphical advertisement display. The ad system can then use the context information when generating candidate image scores for the candidate images that result from the workflow in FIG. 3.

At step 225 of FIG. 2, the ad system generates candidate image scores for one or more of the candidate images. In one embodiment, the candidate image score represents an indicator of the expected performance of the advertisement display into which the candidate image is inserted. In this embodiment, a candidate image that has a higher score may be expected to perform better (i.e., have a better conversion rate, have a better interaction probability, or other similar metrics) than a candidate image that has a lower score.

For example, the ad system can analyze the associated image features for the candidate image(s) and determine the score based upon the image features. In some embodiments, the system can use predictive and/or historical data relating to the context as part of the score generation for a candidate image. As mentioned above, the predictive and/or historical data can include data elements such as a predicted probability of interaction by a user with a computerized graphical advertisement display that includes the candidate image, an expected sales amount associated with the candidate image, and an expected value associated with the candidate image. It should be appreciated that the context and the predictive and/or historical data can relate to additional characteristics such as the publisher of the advertisement display, the advertiser, and so forth—and the system can use these additional characteristics when generating the score.

In some embodiments, the ad system can generate the score for an image based on a display context for the computerized graphical display, such as a webpage in which the computerized graphical display will be included. In some embodiments, the ad system can generate the score for a candidate image based on historical performance data for the candidate image, such as whether the computerized graphical displays generated using the candidate image have resulted in clicks and/or sales in the past. In some embodiments, the ad system can generate the score for a candidate image based on behavioral data for a user associated with the user device, such as prior viewing and purchasing behavior. In some embodiments, the ad system can generate the score for a candidate image based on a temporal context for the computerized graphical advertisement display, such as the time of day, or a geographical context, such as the location of the user device, for the computerized graphical advertisement display.

It should further be appreciated that the ad system can generate a score for any of a seed image, an altered seed image (with one or more mutations applied), and a candidate image. The ad system analyzes the image features associated with each type of image to determine a score for the image. As described previously, the ad system can filter seed images, intermediate images, and/or candidate images based upon the score associated with the image.

At step 230, the ad system selects an image from the candidate image(s) based on the candidate image scores. In some embodiments, the ad system can select the candidate image having the highest score. In some embodiments, the ad system can select a candidate image that does not have the highest score. Beneficially, this can prevent the ad system from using the same candidate image too frequently, and can permit the ad system to test the performance of images that have not been used frequently. In some embodiments, the ad system can select a candidate image based on sampling a subset of the plurality of candidate images, wherein the subset is determined based on the plurality of candidate image scores.

In some embodiments, the ad system can alter one or more image features of the selected candidate image, where the one or more image features are independent of the size of the computerized graphical advertisement display and position-independent, based on one or more of a display context for the computerized graphical advertisement display, historical performance data for the selected candidate image, behavioral data for a user associated with the user device, one or more recommended products for display in the computerized graphical advertisement display, a temporal context for the computerized graphical advertisement display, and a geographical context for the computerized graphical advertisement display. For example, a selected candidate image can be adapted to a particular layout description of the computerized graphical advertisement display—if a layout description provides for an image space that is vertical, the ad system can apply an operation on the candidate image to fit within the vertical space. Other context properties that are relevant include a number of products to be displayed, an absolute and/or relative size of the display, color features of the display, position of the display inside a webpage and/or an application, and so forth.

It should also be appreciated that the ad system can alter the layout description for the computerized graphical advertisement display based upon the selected candidate image. For example, if the selected image is horizontal, the layout description can be altered to allocate space for a horizontal image.

At step 235, the ad system generates graphical display source code based on the selected image, a size of the computerized graphical advertisement display, and display capabilities of the user device. The graphical display source code can include a reference (e.g., a link or URI) to the selected image. In some embodiments, the graphical display source code can be HTML code, JAVASCRIPT, CSS, XML, or a combination thereof. For example, the ad system can use the size of the computerized graphical advertisement display to determine the size and position of the selected candidate image. The ad system can then generate, e.g., HTML code for such size and position-resolved elements. At step 240, the ad system provides the graphical display source code to the user device in the response to the user device's request. For example, the ad system can transmit the graphical display source code to the user device over a network (e.g., network 130). In some embodiments, the user device can render the graphical display source code to display the computerized graphical advertisement display. For example, a browser on the user device can render the graphical display source code to display the computerized graphical advertisement display as a part of a webpage.

In some embodiments, the ad system can select more than one candidate image (e.g., at step 230). The ad system can select different candidate images suitable for display when the user device is in different states. For example, the ad system can select an image for when the user device is in a horizontal orientation and an image for when the user device is in a vertical orientation. More generally, different images can be generated for any state of the user device, such as any aspect of the user device that the user can control dynamically (e.g., size of an advertisement display). The ad system can generate graphical display source code for each of the selected layouts (e.g., at step 235) and provide the graphical display source code for each selected layout to the user device (e.g., step 240). The user device can select graphical display source based on a state of the user device. The user device can render the selected graphical display source code to display the computerized graphical advertisement display.

As mentioned above, it should be appreciated that the ad system can render the images at any point during the process described herein. In some embodiments, it may be advantageous to render only the selected candidate image that will be used in the graphical advertisement display (e.g., to conserve processing overhead for real-time ad generation). In other embodiments, it may be advantageous to render intermediate images (such as the altered seed images) and/or alternative candidate images that may not be selected for the current graphical advertisement display, but may be stored and used for subsequent ad requests.

While the above embodiments of the technology generate graphical display source code for a computerized graphical advertisement display, the technology can be used to generate other graphical display data for a computerized graphical advertisement display. For example, the technology can generate image data, or video data. In some embodiments, for example, generated HTML code can be rendered as a video or image and provided to a requesting user device. In some embodiments, generated images and/or graphical display descriptions can be used for video data directly. In some embodiments, an interaction by a user with the video computerized graphical advertisement can include viewing a predetermined portion of the video (e.g., a pre-roll portion) or a click on the video.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the technology by operating on input data and generating output. Method steps can also be performed by, and apparatus can be implemented as, special purpose logic circuitry, e.g., an FPGA (field programmable gate array) or an ASIC (application specific-integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The technology has been described in terms of particular embodiments. The alternatives described herein are examples for illustration only and not to limit the alternatives in any way. The steps of the technology can be performed in a different order and still achieve desirable results. Other embodiments are within the scope of the following claims.

What is claimed is:

1. A computer-implemented method of generating graphical display source code for a computerized graphical advertisement display, the method comprising:

receiving, by a computing device, from a user device, a request for the graphical display source code for the computerized graphical advertisement display;

retrieving, by the computing device, one or more seed images, each seed image of the one or more seed images including a plurality of associated seed image features and each seed image depicting one or more items to be displayed in the computerized graphical advertisement display;

generating, by the computing device, a plurality of candidate images based on at least the one or more seed images, comprising:

altering, by the computing device, a first aspect of a seed image according to a first alteration in a first sequence of alterations to generate a first altered seed image having a plurality of associated altered seed image features, wherein altering the first aspect of the seed image comprises at least one of: cropping at least a portion of the seed image, applying an image filter to at least a portion of the seed image, or merging another image with the seed image to generate the first altered seed image, and altering, by the computing device, a second aspect of the first altered seed image according to a second alteration in the first sequence of alterations to generate a candidate image having a plurality of associated candidate image features, wherein altering the second aspect of the first altered seed image comprises at least one of: cropping at least a portion of the first altered seed image, applying an image filter to at least a portion of the first altered seed image, or merging another image with the first altered seed image to generate the first candidate image, reordering the first sequence of alterations to generate a second sequence of alterations that is different from the first sequence of alterations, altering a first aspect of the seed image based upon a first alteration in the second sequence of alterations to generate a second altered seed image having a plurality of associated altered seed image features, wherein altering the first aspect of the seed image comprises at least one of: cropping at least a portion of the seed image, applying an image filter to at least a portion of the seed image, or merging another image with the seed image to generate the second altered seed image, and altering a second aspect of the second altered seed image based upon a second alteration in the second sequence of alterations to generate a second candidate image having a plurality of associated candidate image features, wherein altering the second aspect of the second altered seed image comprises at least one of: cropping at least a portion of the second altered seed image, applying an image filter to at least a portion of the second altered seed image, or merging another image with the second altered seed image to generate the second candidate image;

determining, by the computing device, a context associated with the computerized graphical advertisement display;

generating, by the computing device, a plurality of candidate image scores, each candidate image score of the plurality of candidate image scores associated with a candidate image of the plurality of candidate images and each candidate image score based upon the context and the plurality of associated candidate image features;

selecting, by the computing device, an image from the plurality of candidate images based on the plurality of candidate image scores;

generating, by the computing device, the graphical display source code based on the selected image, a size of the computerized graphical advertisement display, and one or more display capabilities of the user device; and providing, by the computing device, to the user device, the graphical display source code.

2. The method of claim 1, further comprising:
rendering, by the user device, the graphical display source code to display the computerized graphical advertisement display.

3. The method of claim 1, wherein the graphical display source code comprises one or more of HTML, JAVASCRIPT, CSS or XML.

4. The method of claim 1, wherein the graphical display source code includes a reference to the selected image.

5. The method of claim 1, wherein the graphical display source code includes a reference to a video containing the selected image.

6. The method of claim 1, wherein the associated seed image features include one or more of: image size, image compression, image encoding type, frame count, file weight, image metadata, image colors, image context, image resolution, image category, one or more shapes in the image, or one or more objects in the image.

7. The method of claim 1, wherein the associated altered seed image features include one or more of: image size, image compression, image encoding type, frame count, file weight, image metadata, image colors, image context, image resolution, image category, one or more shapes in the image, or one or more objects in the image.

8. The method of claim 1, wherein the associated candidate image features include one or more of: image size, image compression, image encoding type, frame count, file weight, image metadata, image colors, image context, image resolution, image category, one or more shapes in the image, or one or more objects in the image.

9. The method of claim 1, wherein the context comprises one or more of: a layout description for the computerized graphical advertisement display, a placement of the computerized graphical advertisement display on a website, an application associated with the computerized graphical advertisement display, or one or more features of a user associated with the request.

10. The method of claim 1, further comprising:
extracting, by the computing device, at least a portion of the associated altered seed image features from the first altered seed image; and
generating, by the computing device, an altered seed image score for the first altered seed image based upon the extracted image features and the context associated with the computerized graphical advertisement display.

11. The method of claim 10, further comprising:
removing, by the computing device, an altered seed image from the plurality of altered seed images based upon a comparison of the extracted image features for the altered seed image with extracted image features for one or more other altered seed images.

12. The method of claim 1, wherein generating, by the computing device, the plurality of candidate images based on at least the one or more seed images comprises:
excluding, by the computing device, one or more candidate images based on a pre-determined constraint on a feature of the candidate image.

13. The method of claim 1, wherein generating, by the computing device, the plurality of candidate images based on at least the one or more seed images comprises:
excluding, by the computing device, one or more candidate images by random sampling.

14. The method of claim 1, wherein generating, by the computing device, the plurality of candidate images based on at least the one or more seed images comprises:
excluding, by the computing device, one or more candidate images based upon predicted scores associated with the one or more candidate images.

15. The method of claim 1, wherein generating, by the computing device, the plurality of candidate image scores, each candidate image score of the plurality of candidate image scores associated with a candidate image of the plurality of candidate images comprises:

generating, by the computing device, the score for a candidate image based on one or more of a predicted probability of interaction by a user with a computerized graphical advertisement display that includes the candidate image, an expected sales amount associated with the candidate image, an expected advertiser margin associated with the candidate image, and an expected value associated with the candidate image.

16. The method of claim 15, wherein the interaction by a user with the computerized graphical advertisement display based on the candidate image is a click on the computerized graphical advertisement display based on the candidate image.

17. The method of claim 1, wherein generating, by the computing device, the plurality of candidate image scores, each candidate image score of the plurality of candidate image scores associated with a candidate image of the plurality of candidate images comprises:
    generating, by the computing device, the score for a candidate image based on one or more of a display context for the computerized graphical display, historical performance data for the candidate image, behavioral data for a user associated with the user device, one or more recommended products for display in the computerized graphical display, a temporal context for the computerized graphical display, and a geographical context for the computerized graphical display.

18. The method of claim 1, wherein selecting, by the computing device, an image from the plurality of candidate images based on the plurality of candidate image scores comprises:
    selecting, by the computing device, a candidate image from the plurality of candidate images having a highest candidate image score of the plurality of candidate image scores.

19. The method of claim 1, wherein selecting, by the computing device, an image from the plurality of candidate images based on the plurality of candidate image scores comprises:
    selecting, by the computing device, a candidate image from the plurality of candidate images having a candidate image score lower than a highest candidate image score of the plurality of candidate image scores.

20. The method of claim 1, wherein selecting, by the computing device, an image from the plurality of candidate images based on the plurality of candidate image scores comprises:
    selecting, by the computing device, a candidate image from the plurality of candidate images based on sampling a subset of the plurality of candidate images, wherein the subset is determined based on the plurality of candidate image scores.

21. The method of claim 1, further comprising:
    altering, by the computing device, one or more image features of the selected image, wherein the one or more image features are independent of the size of the computerized graphical advertisement display and position-independent, based on one or more of a display context for the computerized graphical display, historical performance data for the selected image, behavioral data for a user associated with the user device, one or more recommended products for display in the computerized graphical display, a temporal context for the computerized graphical display, and a geographical context for the computerized graphical display.

22. The method of claim 1, wherein one or more candidate images of the plurality of candidate images are generated by the computing device altering one or more of the associated candidate image features of a second candidate image of the plurality of candidate images.

23. The method of claim 1, wherein retrieving, by the computing device, the one or more seed images comprises:
    selecting, by the computing device, the one or more seed images based on the one or more display capabilities of the user device.

24. The method of claim 1, further comprising:
    selecting, by the computing device, a second image from the plurality of candidate images based on the context and the plurality of candidate image scores;
    generating, by the computing device, second graphical display source code based on the second image, the size of the computerized graphical advertisement display, and the one or more display capabilities of the user device; and
    providing, by the computing device, to the user device, the second graphical display source code.

25. A system for generating graphical display source code for a computerized graphical advertisement display, the system comprising a computing device that:
    receives, from a user device, a request for the graphical display source code for the computerized graphical advertisement display;
    retrieves one or more seed images, each seed image of the one or more seed images including a plurality of associated seed image features and each seed image depicting one or more items to be displayed in the computerized graphical advertisement display;
    generates a plurality of candidate images based on at least the one or more seed images, comprising:
        altering a first aspect of a seed image according to a first alteration in a first sequence of alterations to generate a first altered seed image having a plurality of associated altered seed image features, wherein altering the first aspect of the seed image comprises at least one of: cropping at least a portion of the seed image, applying an image filter to at least a portion of the seed image, or merging another image with the seed image to generate the first altered seed image, and
        altering a second aspect of the first altered seed image according to a second alteration in the first sequence of alterations to generate a candidate image having a plurality of associated candidate image features, wherein altering the second aspect of the first altered seed image comprises at least one of: cropping at least a portion of the first altered seed image, applying an image filter to at least a portion of the first altered seed image, or merging another image with the first altered seed image to generate the first candidate image,
        reordering the first sequence of alterations to generate a second sequence of alterations that is different from the first sequence of alterations,
        altering a first aspect of the seed image based upon a first alteration in the second sequence of alterations to generate a second altered seed image having a plurality of associated altered seed image features, wherein altering the first aspect of the seed image comprises at least one of: cropping at least a portion of the seed image, applying an image filter to at least a portion of the seed image, or merging another image with the seed image to generate the second altered seed image, and altering a second aspect of the second altered seed image based upon a second alteration in the second sequence of alterations to generate a second candidate image having a plurality of associated candidate image features, wherein altering the second aspect of the second altered seed image comprises at least one of: cropping at least a portion of the second altered seed image, applying an image filter to at least a portion of the second altered seed image, or merging another image with the second altered seed image to generate the second candidate image;

determines a context associated with the computerized graphical advertisement display;

generates a plurality of candidate image scores, each candidate image score of the plurality of candidate image scores associated with a candidate image of the plurality of candidate images and each candidate image score based upon the context and the plurality of associated candidate image features;

selects an image from the plurality of candidate images based on the plurality of candidate image scores;

generates the graphical display source code based on the selected image, a size of the computerized graphical advertisement display, and one or more display capabilities of the user device; and provides, to the user device, the graphical display source code.

* * * * *